United States Patent [19]

Chung et al.

[11] Patent Number: 4,749,505
[45] Date of Patent: Jun. 7, 1988

[54] OLEFIN POLYMER VISCOSITY INDEX IMPROVER ADDITIVE USEFUL IN OIL COMPOSITIONS

[75] Inventors: David Y. Chung, Edison; John E. Johnston, Westfield, both of N.J.

[73] Assignee: Exxon Chemical Patents Inc., Linden, N.J.

[21] Appl. No.: 752,627

[22] Filed: Jul. 8, 1985

[51] Int. Cl.$^4$ ............... C10M 105/08; C10M 105/56
[52] U.S. Cl. .................... 252/51.5 A; 252/33; 252/47.5; 252/56 D; 252/56 R; 525/285; 525/301; 525/374; 525/375; 525/382; 525/386
[58] Field of Search .................. 252/51.5 A, 33, 47.5, 252/56 D, 56 R, 285, 301; 525/331.7, 374, 375, 382, 386

[56] References Cited

U.S. PATENT DOCUMENTS

| | | | |
|---|---|---|---|
| 2,744,069 | 5/1956 | van Loon | 252/40.7 |
| 2,807,643 | 9/1957 | Hartley | 260/520 |
| 2,865,956 | 12/1958 | Ellis et al. | 260/504 |
| 3,024,195 | 3/1962 | Drummond et al. | 252/51.5 |
| 3,024,237 | 3/1962 | Drummond et al. | 260/268 |
| 3,087,936 | 4/1963 | LeSuer | 260/326.3 |
| 3,150,088 | 9/1964 | Hunt et al. | 252/32.7 |
| 3,150,089 | 9/1964 | Hunt | 252/33 |
| 3,154,560 | 10/1964 | Osuch | 260/326.3 |
| 3,172,892 | 3/1965 | LeSuer et al. | 260/326.5 |
| 3,202,678 | 8/1965 | Stuart et al. | 260/326.5 |
| 3,216,666 | 11/1965 | Norman et al. | 260/268 |
| 3,216,936 | 11/1965 | LeSuer | 252/32.7 |
| 3,236,917 | 2/1966 | Natta et al. | 260/873 |
| 3,254,025 | 5/1966 | LeSuer | 252/32.7 |
| 3,275,554 | 9/1966 | Wagenaar | 252/50 |
| 3,311,558 | 3/1967 | Prizer | 252/47.5 |
| 3,316,177 | 4/1967 | Dorer, Jr. | 252/51.5 |
| 3,442,808 | 5/1969 | Traise et al. | 252/49.6 |
| 3,565,804 | 2/1971 | Honnen et al. | 252/50 |
| 3,687,849 | 8/1972 | Abbott | 252/47.5 |
| 3,687,905 | 8/1972 | Dorer | 260/78.4 D |
| 3,704,315 | 11/1972 | Strang | 260/521 R |
| 3,786,077 | 1/1974 | Chandler | 260/408 |
| 3,862,265 | 1/1975 | Steinkamp et al. | 260/878 R |
| 4,039,560 | 8/1977 | Tomoshige | 260/346.3 |
| 4,068,056 | 1/1978 | Engel et al. | 526/49 |
| 4,068,057 | 1/1978 | Engel et al. | 526/49 |
| 4,068,058 | 1/1978 | Engel et al. | 526/49 |
| 4,089,794 | 5/1978 | Engel et al. | 252/51.5 A |
| 4,092,255 | 5/1978 | Chapelet et al. | 252/50 |
| 4,113,639 | 9/1978 | Lonstrup et al. | 252/51.5 A |
| 4,137,185 | 1/1979 | Gardiner et al. | 252/33 |
| 4,144,181 | 3/1979 | Elliott et al. | 252/33 |
| 4,146,489 | 3/1979 | Stambaugh et al. | 252/50 |
| 4,160,072 | 7/1979 | Shinkai et al. | 521/86 |
| 4,160,739 | 7/1979 | Stambaugh et al. | 252/34 |
| 4,161,452 | 7/1979 | Stambaugh et al. | 252/34 |
| 4,170,561 | 10/1979 | Chapelet et al. | 252/51.5 A |
| 4,235,731 | 11/1980 | Kiovsky | 252/51.5 A |
| 4,382,007 | 5/1983 | Chafetz et al. | 252/51.5 A |
| 4,440,659 | 4/1984 | Chen et al. | 252/51.5 A |
| 4,517,104 | 5/1985 | Bloch et al. | 252/51.5 A |
| 4,557,847 | 12/1985 | Gutierrez et al. | 252/51.5 A |

FOREIGN PATENT DOCUMENTS

| | | |
|---|---|---|
| 0991792 | 6/1976 | Canada . |
| 0123424 | 10/1984 | European Pat. Off. . |
| 036274 | of 0000 | Japan . |
| 46/0065417 | 10/1971 | Japan . |
| 46-35370 | 10/1971 | Japan . |
| 55/0110453 | 3/1980 | Japan . |
| 110453 | 3/1980 | Japan . |
| 0832193 | 4/1960 | United Kingdom . |
| 0857797 | 1/1961 | United Kingdom . |
| 0983040 | 2/1965 | United Kingdom . |
| 1119629 | 7/1968 | United Kingdom . |
| 2040296 | 8/1980 | United Kingdom . |

OTHER PUBLICATIONS

Product Bulletin, "Dialkyl Peroxides," Lucidol Pennwalt Revised, 3/82, Reprinted/82.

*Primary Examiner*—William R. Dixon, Jr.
*Assistant Examiner*—Margaret B. Medley
*Attorney, Agent, or Firm*—W. G. Muller

[57] ABSTRACT

Olefin polymers are degraded in molecular weight in the presence of a free radical initiator under an inert blanket. The degradation preferably is carried out under high shearing stress and/or a high temperature in order to increase the degradation. The degradation may be separate from, overlap, or occur simultaneously with further derivatization of the polymer.

44 Claims, No Drawings

OLEFIN POLYMER VISCOSITY INDEX IMPROVER ADDITIVE USEFUL IN OIL COMPOSITIONS

BACKGROUND OF THE INVENTION

1. Field of the Invention

Oil soluble olefin polymers are degraded to various molecular weights suitable for use as more shear stable Viscosity Index improvers for lubricating oil by heating in the presence of a free radical initiator in an inert atmosphere. By excluding oxygen during degradation the degraded polymer has a desirable, reduced tendency towards viscosity increasing interaction with other conventional lubricating oil additives such as ashless dispersants and detergent inhibitors. The degradation of the olefin polymer may take place before or during further reaction of the olefin polymer to form VI-dispersant additives. The invention includes the processes of producing the additives, the additives produced by the processes, and oil compositions containing the additives.

2. Prior Disclosures

Olefin or hydrocarbon polymers such as hydrogenated copolymers of isoprene and butadiene, copolymers of butadiene and styrene, and ethylene copolymers, particularly ethylene-propylene copolymers are known as viscosity index (V.I.) improving additives for oil compositions, particularly lubricating oil compositions. A substantial body of prior art exists directed towards further reacting these ethylene V.I. improvers to form a multi-functional V.I. improver. This is a material useful as a V.I.-dispersant oil additive so as to improve not only the V.I. properties of the oil but to also impart dispersancy so as to suspend sludge that may form during the operation or use of the lubricant and to inhibit varnish deposition in engines. For example, patents teach grafting ethylene copolymers with maleic anhydride, followed by reaction with an amine, such as U.S. Pat. Nos. 4,137,185, 4,144,181 and 4,089,794. Similarly, prior patents, such as U.S. Pat. Nos. 4,092,255, 4,146,489 and 4,170,561, were directed towards grafting the ethylene copolymer directly with a nitrogen compound such as vinyl pyridines and vinyl pyrrolidones. Various other patents, such as U.S. Pat. Nos. 4,068,056; 4,068,057 and 4,068,058, teach amines directly grafted upon an ethylene-propylene copolymer by mastication or by an extruder, either under a nitrogen atmosphere as U.S. Pat. No. 4,068,057 or in the presence of oxygen as in U.S. Pat. Nos. 4,068,058 and 4,068,056.

U.S. Pat. No. 3,862,265 has a broad disclosure of extruder-grafting a wide range of polymers including ethylene-propylene elastomers with various monomers, including maleic anhydride. U.K. Pat. No. 857,797 teaches grafting polymers by mastication using peroxide and in the presence of oxygen or air. U.K. Pat. No. 1,119,629 grafts maleic anhydride onto synthetic rubber in an extruder using inhibitors to control cross-linking. U.K. Pat. No. 832,193 has an extensive disclosure wherein various monomers were grafted by mastication upon various polymers using various techniques. The use of chain stopping agents or chain transfer agents have been suggested to inhibit cross-linking, as in U.S. Pat. No. 4,160,072; published Japanese Patent Application No. JA 53-110453 (Publication No. 55-36274) 1980, and in Japanese Patent Publication No. 46-35370 (1971).

It is also known to degrade olefin polymers to form a variety of lower molecular weight V.I. improving additive grades from a single starting grade that can be made in large volumes in a polymer plant. This also permits readily forming the lower molecular weight products which are difficult to directly make in a polymer plant because their low viscosity interferes with the usual polymer finishing steps. For example, U.S. Pat. Nos. 3,316,177 and 3,687,905 teach degradation as part of a grafting process while Canadian Pat. No. 991,792 teaches degradation by extrusion. European Published Patent Application No. 0123424 oxidatively degrades an olefin polymer in an inert solvent in the absence of molecular oxygen and in the presence of an oxidant mixture of at least one peroxide and at least one hydroperoxide.

One aspect of the present invention is based upon the finding that degrading the polymer in the presence of air can result in a polymer that will interact with other additives to give an undesirable viscosity increase, which degradation in the absence of air inhibits this interaction. It is not known with certainty why this interaction occurs, but it may be due to the formation of oxygenated sites such as ketones, aldehydes, acid carbonyls, etc. on the polymer, which later react or have an affinity with other additives to cause the viscosity growth. The present invention heats the polymer under nitrogen in the presence of a free radical initiator, which acts as a catalyst to speed up the degradation. Preferably, the degradation is carried out under shearing stress, which further speeds up the degradation. If the degraded polymer is to be used to form a V.I.-dispersant additive, the degradation may be carried out before, during, or overlapping the grafting or derivatization of the degraded hydrocarbon polymer to form a V.I.-dispersant additive. The present invention is a further improvement in forming useful oil soluble additives, wherein the degradation is carried out with the solid olefin rubber in the substantial absence of any chemical solvent. This avoids the need to remove the chemical solvent. Thus, the present invention can use a free radical generator when carrying out grafting in the solid state with an unsaturated monomer which may either be a nitrogen monomer or an unsaturated acid which can then be subsequently reacted, e.g. with an amine in a subsequent reaction to form oil soluble V.I.-dispersant additives.

DESCRIPTION OF PREFERRED EMBODIMENT

Olefin Polymer

Oil soluble olefin polymers used in the invention generally will have a number average molecular weight ($\overline{M}_n$) of from about 5000 to about 500,000; preferably 10,000 to 200,000 and optimally from about 20,000 to 100,000. In general, polymers useful as V.I. improvers will be used. These V.I. improvers will generally have a narrow range of molecular weight, as determined by the ratio of weight average molecular weight ($\overline{M}_w$) to number average molecular weight ($\overline{M}_n$). Polymers having a ($\overline{M}_w/\overline{M}_n$) of less than 10, preferably less than 7, and more preferably 4 or less are most desirable. As used herein ($\overline{M}_n$) and ($\overline{M}_w$) are measured by the well known techniques of vapor phase osmometry (VPO), membrane osmometry and gel permeation chromotography.

Examples of suitable hydrocarbon polymer include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkylaromatic, cycloaliphatic, etc. Frequently, they will be of ethylene with $C_3$ to $C_{30}$ olefins, preferably copolymers of ethylene and propylene. Examples of polymers of other olefins include butene, isobutylene, polymers and copolymers of $C_6$ and higher alpha olefins, atactic polypropylene, hydrogenated polymers, styrene, e.g. with isoprene and/or butadiene, etc.

The preferred polymers are prepared from ethylene and ethylenically unsaturated hydrocarbons including cyclic, alicyclic and acyclic, containing from 3 to 28 carbons, e.g. 2 to 18 carbons. These ethylene copolymers may contain from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1,4,4-dimethyl-1-pentene, and 6-methylheptene-1, etc., and mixtures thereof.

The term copolymer as used herein, unless otherwise indicated, includes terpolymers, tetrapolymers, etc., of ethylene, said $C_{3-28}$ alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6-octadiene.

b. Branched chain acyclic dienes such as: 5-methylene-1,4-hexadiene; 3,7-dimethyl 1,6-octadiene; 3,7-dimethyl 1,7-octadiene; and the mixed isomers of dihydro-myrcene and dihydro-cymene.

c. Single ring alicyclic dienes such as: 1,4-cyclohexadiene; 1,5-cyclooctadiene; 1,5-cyclo-dodecadiene; 4-vinylcyclohexene; 1-allyl, 4-isopropylidene cyclohexane; 3-allyl-cyclopentene; 4allyl cyclohexane; and 1-isopropenyl-4-(4-butenyl) cyclohexane.

d. Multi-single ring alicyclic dienes such as: 4,4'-dicyclopentenyl and 4,4'-dicyclohexenyl dienes.

e. Multi-ring alicyclic fused and bridged ring dienes such as: tetrahydroindene; methyl tetrahydroindene; dicyclopentadiene; bicyclo(2.2.1)hepta 2,5-diene; alkyl, alkenyl, alkylidene, cycloalkenyl and cycloalkylidene norbornenes such as: ethyl norbornene; 5-methylene-6-methyl-2-norbornene; 5methylene-6,6-dimethyl-2-norbornene; 5-propenyl-2-norbornene; 5-(3-cyclopentenyl)-2-norbornene and 5-cyclohexylidene-2-norbornene; norbornadiene; etc.

Ethylenically Unsaturated Carboxylic Acid Material

These materials which may be grafted onto the hydrocarbon polymer contain 3 to 10 carbon atoms and at least one ethylenic unsaturation and and at least one, preferably two, carboxylic acid groups, or an anhydride group, or a polar group which is convertible into said carboxyl groups as by oxidation or hydrolysis. Maleic anhydride or a derivative thereof is preferred as it does not homopolymerize appreciably but attaches onto the polymer to give to carboxylic acid functionalities. Such preferred materials have the generic formula

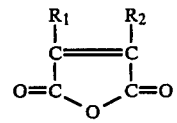

wherein $R_1$ and $R_2$ are hydrogen or a halogen. Suitable examples additionally include chloro-maleic anhydride, itaconic anhydride, hemic anhydride or the corresponding dicarboxylic acids, such as maleic acid or fumaric acid or their monoesters, etc.

As taught by U.S. Pat. No. 4,160,739 and U.S. Pat. No. 4,161,452 various unsaturated comonomers may be grafted on the olefin polymer together with the unsaturated acid component, e.g. maleic anhydride. Such graft monomer systems may comprise one or a mixture of comonomers different from the unsaturated acid component and which contain only one copolymerizable double bond and are copolymerizable with said unsaturated acid component. Typically, such comonomers do not contain free carboxylic acid groups and are esters containing $\alpha,\beta$-ethylenic unsaturation in the acid or alcohol portion; hydrocarbons, both aliphatic and aromatic, containing $\alpha,\beta$-ethylenic unsaturation, such as the $C_4$–$C_{12}$ alpha olefins, for example isobutylene, hexene, nonene, dodecene, etc.; styrenes, for example styrene, $\alpha$-methyl styrene, p-methyl styrene, p-sec. butyl styrene, etc.; and vinyl monomers, for example vinyl acetate, vinyl chloride, vinyl ketones such as methyl and ethyl vinyl ketone, etc. Comonomers containing functional groups which may cause crosslinking, gelation or other interfering reactions should be avoided, although minor amounts of such comonomers (up to about 10% by weight of the comonomer system) often can be tolerated.

Unsaturated Nitrogen Containing Monomer

Nitrogen containing unsaturated compounds are well known in forming polymers useful as oil additives. These monomers may be used for grafting onto the olefin polymer and include, among others those having 6 to 30 carbon atoms and 1 to 4 nitrogen atoms.

Nitrogen containing acrylate and methacrylate monomers may be used such as dimethylaminoethyl methacrylate or acrylate; acrylamides and methacrylamides such as N-(1,1-dimethyl-3-oxobutyl)acrylamide, N-(1,2-dimethyl-1-ethyl-3-oxobutyl)acrylamide, N-(1,3-diphenyl-1-methyl-3-oxoproyl)acrylamide, N-(1-methyl-1-phenyl-3-oxobutyl)methacrylamide, N,N-diethylaminoethyl acrylamide, 2-hydroxyethyl acrylamide, N-dimethylaminopropyl acrylamide and methacrylamide.

N-vinylcaprolactams may be used. These include N-vinylpyrrolidone, N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, etc.

Vinyl pyridines may be used, such as 2-vinylpyridine, 4-vinylpyridine, and lower alkyl ($C_1$–$C_8$)substituted C-vinylpyridines, such as 2-methyl-5-vinylpyridine, 2-methyl-4-vinylpyridine, 2-vinyl-5-ethyl pyridine, 2-vinyl-6-methylpyridine, etc.

Grafting of the Ethylene Copolymer

The degradation of the olefin polymer may be carried out in a masticator, a rubber mill, a Banbury mixer, Brabender mixers, and other mechanical mixing devices which can mix or knead the rubber at elevated temperatures with the other components of the reaction into a homogeneous solid rubbery mass so degradation can take place in the solid state. Combinations of equipment may also be used, such as a low temperature mixer for premixing the ingredients, following which they can be transferred to a high temperature heated mixer for degradation. Similar equipment may also be used for the graft reaction.

The degradation and/or radical grafting is preferably carried out using free radical initiators such as peroxides, and preferably those which have a boiling point greater than about 100° C. Representative of these free-radical initiators are di-lauroyl peroxide, 2,5-di-methyl-hex-3-yne-2,5-bis-tertiary-butyl peroxide (sold as Lupersol 130) or its hexane analogue, di-tertiary butyl peroxide and dicumyl peroxide. The presence of an acid, e.g. maleic anhydride, with the peroxide is preferred as it catalyzes the decomposition of the peroxide to activate the peroxide. Other activators of the peroxide, other than acid, can be used such as the hydroperoxides disclosed by European Published Patent Application No. 0123424, including cumene hydroperoxide, hydrogen peroxide, tertiary butyl hydroperoxide, etc. The initiator is generally used at a level of between about 0.005% and about 1%, e.g. 0.05 to 0.5%, based on the total weight of the olefin polymer, and temperatures of about 120° to 250° C.

The initiator degradation and/or grafting is preferably carried out at 120°-250° C., more preferably 150°-220° C. An inert atmosphere, such as that obtained by nitrogen blanketing is used. The total time for degradation and/or grafting will usually range from about 0.005 to 12 hours. If carried out in an extruder, the total time will be relatively short, e.g. 0.005 to 0.2 hours. In a masticator usually from about 0.5 to 6 hours, more preferably 0.5 to 3 hours total time will be required. The degradation and/or graft reaction will be usually carried out to at least approximately 4 times, preferably at least about 6 times the half-life of the free-radical initiator at the reaction temperature employed, e.g. with 2,5-dimethyl hex-3-yne-2,5-bis(t-butyl peroxide) 2 hours at 160° C. and one hour at 170° C., etc.

Degradation can take place separately by heating and mixing with the initiator, preferably under shearing stress. This can then be followed by or overlap the grafting process, wherein the other ingredients, such as the unsaturated graft material, e.g. maleic anhydride, chain stopper and perhaps more initiator, are added with mixing. When the reaction is complete, the excess monomer material may be eliminated by an inert gas purge, e.g. nitrogen sparging.

The ethylenically unsaturated nitrogen monomer or carboxyic acid material, preferably maleic anhydride, will be generally used in an amount ranging from about 0.1 to about 10%, preferably 0.5 to 5.0%, based on weight of the initial olefin polymer. The aforesaid carboxylic acid or nitrogen monomer material and free radical initiator are generally used in a weight percent ratio range of 1.0:1 to 30:1, preferably 4.0:1 to 12:1.

A chain stopping agent is preferably used, such as sulfur-containing materials such as an aliphatic mercaptan having 4 to 24 carbon atoms, such as t-butyl mercaptan, n-butyl mercaptan, octyl mercaptan, n-dodecyl mercaptan, t-dodecyl mercaptan, etc. The tertiary mercaptans and diethyl hydroxyl amine are particularly effective and are the most preferred. Other chain stopping agents may be used, for example, cumene, alcohols, phenols, etc. The chain stopper will be generally used in an amount of 0.05 to 10 wt. %, e.g. 0.1 to 5 wt. %, based on the weight of the olefin polymer.

After the degradation and/or grafting is complete, diluent oil, such as mineral lubricating oil, may be mixed into the treated polymer to form a concentrate. This dilution can be carried out in a masticator used for the degradation and/or grafting, or dilution can be carried out in a separate heating and mixing vessel. The oil solution can be the final additive product. On the other hand, if unsaturated acid or anhydride, such as maleic anhydride was grafted on the polymer, then a further reaction with an amine or hydroxy component is carried out to form a V.I.-dispersant additive. This can be carried out using the undiluted graft polymer, but will more usually be carried out using the diluted grafted polymer, in a separate reaction vessel from that used for grafting.

The Amine Component

Useful amine compounds for neutralization of the acid, e.g. maleic anhydride grafted ethylene copolymer include mono- and polyamines of about 2 to 60, e.g. 3 to 20, total carbon atoms and about 1 to 12, e.g., 2 to 7 nitrogen atoms in the molecule. These amines may be hydrocarbyl amines or may be hydrocarbyl amines including other groups, e.g., alkoxy groups, amide groups, imidazoline groups, and the like.

Non-limiting examples of suitable amines include: 3-dodecyloxypropylamine; mono-tallow amine; amino morpholines such as N-(3-aminopropyl)morpholine and N-(2-aminoethyl)morpholine; substituted pyridines such as 2-amino pyridine, 2-methylamino pyridine and 3-methylamino pyridine; and others such as 2-amino-thiazole; 2-amino-2-thiazoline; 2-amino pyrimidine; 2-amino benzothiazole; methyl-1-phenyl hydrazine and para-morpholino aniline, etc.

Useful amines also include piperadines and piperazines of the general formula

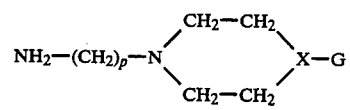

where X is CH (piperadines) or N (piperazines) where G is hydrogen or alkyl groups of 1 to 3 carbon atoms while p is 1 to 6.

Useful amines include pyridines of the structures:

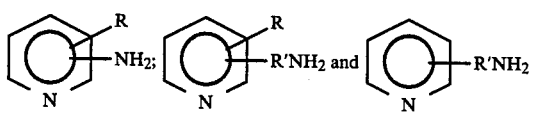

where R is a $C_1$ to $C_{24}$, e.g. $C_1$ to $C_8$ hydrocarbon group, e.g. alkyl group and R' is a $C_1$ to $C_{24}$, e.g. $C_1$ to $C_8$ alkylene group.

Alcohol tertiary amines may also be used, such as those of the formula

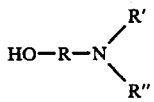

where R is a $C_2$ to $C_{24}$ alkylene group while R' and R" are alkyl groups of 1 to 10 carbons e.g. methyl, n-butyl, isobutyl, etc.

Examples of amines with 2 or more reactive groups which may be used together with amines of 1 reactive group include alkylene polyamines such as 1,2-diaminoethane; 1,3-diaminopropane; polyethylene amines such as diethylene triamine, triethylene tetramine, etc.

Especially preferred are amines having a single primary amine group, with any other amine groups present being tertiary amine groups. This inhibits cross-linking which is particularly important when the polymer has a relatively high degree of acidity, e.g. above 0.1 meq./g. of polymer. Mixtures comprising about 70 wt. % or more of amines having only a single primary or secondary group may be used with small amounts of amines having two or more primary or secondary amine groups. Acidities below 0.1 meq./g. polymer are less sensitive to cross-linking and amines with 2 or more reactive groups, i.e. either primary or secondary amine groups, or both primary and secondary amine groups, or a primary amine group and an alcohol group, may be used.

The polyamines will be generally used in the range of 0.1 to 10 wt. %, preferably 0.5 to 5wt. %, based on the weight of the ethylene copolymer. The polyamine is preferably used in an amount that neutralizes the acid moieties by formation of amides, imides or salts.

Preferably, the amount of polyamine used is such that there is 1 to 2 moles of polyamine reacted per equivalent mole of dicarboxylic acid. For example, with an ethylene-propylene copolymer of 40,000 number average molecular weight, grafted with an average of 4 maleic anhydride groups per molecule, preferably about 4 to 8 molecules of polyamine is used per molecule of grafted ethylene-propylene copolymer.

Reaction of Grafted Ethylene Copolymer with Amine Component

The polymer, grafted with acidic moieties, preferably in solution generally equal to about 5 to 30 wt. %, preferably 10 to 20 wt. % polymer, can be readily reacted with amines by heating at a temperature of from about 100° C. to 250° C., preferably from 120° to 230° C., for from about 0.5 to 10 hours, usually about 1 to about 6 hours. The heating is preferably carried out to favor formation of imides, and amides. Reaction ratios can vary considerably, depending upon the reactants, amounts of excess, type of bonds formed, etc.

Compositions

A minor amount, e.g. 0.001 to 50 wt. %, preferably 0.005 to 25 wt. %, based on the weight of the total composition, of the degraded and/or grafted oil-soluble olefin polymers produced in accordance with this invention can be incorporated into a major amount of an oleaginous material, such as a lubricating oil or hydrocarbon fuel, depending upon whether one is forming finished products or additive concentrates. When used in lubricating oil compositions, e.g., automotive or diesel crankcase lubricating oil, the final degraded and/or grafted polymer concentrations are usualy within the range of about 0.01 to 10 wt. %, e.g., 0.1 to 6.0 wt. %, preferably 0.25 to 3.0 wt. %, of the total composition. The lubricating oils to which the products of this invention can be added include not only hydrocarbon oil derived from petroleum, but also include synthetic lubricating oils such as esters of dicarboxylic acids; complex esters made by esterification of monocarboxylic acids, polyglycols, dicarboxylic acids and alcohols; polyolefin oils, etc.

The V.I. and V.I.-dispersant graft polymers of the invention may be utilized in a concentrate form, e.g., in a minor amount from about 5 wt.% up to about 50 wt. %, preferably 7 to 25 wt. %, in a major amount of oil, e.g., mineral lubricating oil, for ease of handling.

The above oil compositions may contain other conventional additives, such as dyes, pour point depressants, antiwear agents, antioxidants, other viscosity-index improvers, dispersants, etc.

While not known with complete certainty, viscosity increasing interactions seem to generally involve zinc dithiophosphate, ashless dispersant and metal detergent. The materials of the inventin minimize viscosity growth interactions involving lubricants containing one or more of these three classes of additive.

Zinc Dithiophosphates

Zinc dihydrocarbyl dithiophosphates are common antiwear and antioxidant additives. They are generally prepared in accordance with known techniques by first forming a dithiophosphoric acid, usually by reaction of an alcohol or a phenol with $P_2S_5$ and then neutralizing the dithiophosphoric acid with a suitable zinc compound such as zinc oxide, hydroxides or carbonate. Mixtures of alcohols may be used including mixtures of primary and secondary alcohols. Commercial additives frequently contain an excess of zinc due to use of an excess of the basic zinc compound in the neutralization reaction.

The zinc dihydrocarbyl dithiophosphates may be represented by the following formula:

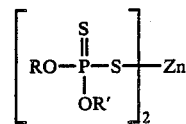

wherein R and R' may be the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl etc. In order to obtain oil solubility, the total number of carbon atoms (i.e. R and R') in the dithiophosphoric acid will generally be about 5 or greater.

The lubricating compositions of the present invention may and usually will contain other traditional lubricant additives such as rust inhibitors such as lecithin, sorbitan mono-oleate, dodecyl succinic anhydride or ethoxylated alkyl phenols; pour point depressants such as copolymers of vinyl acetate with fumaric acid esters of coconut oil alcohols; viscosity index improvers such as olefin copolymers, polymethacrylates; etc.

Other antioxidants in addition to the zinc dialkyldithiophosphate are sometimes required to improve the oxidative stability of the oil. These supplementary antioxidants are included especially when the basestock has poor oxidative stability; and typically the supplementary antioxidant is added to the oil in amounts from 0.5–2.5 wt. %. The supplementary antioxidants that are used include phenols, hindered-phenols, bis-phenols, and sulphurized phenols, catechol, alkylated catechols and sulphurized alkyl catechols, diphenylamine and alkyl diphenylamines,, phenyl-1-naphthylamine and its alkylated derivatives, alkyl borates and aryl borates, alkyl phosphites and alkyl phosphates, aryl phosphites and aryl phosphates, O,O,S-trialkyl dithiophosphates, O,O,S-triaryl dithiophosphates and O,O,S-trisubstituted dithiophosphates containing both alkyl and aryl groups.

Ashless Dispersants

The dispersancy can be provided by a conventional lubricating oil ashless dispersant compounds such as derivatives of long chain hydrocarbon substituted carboxylic acids in which the hydrocarbon groups contains 50 to 400 carbon atoms. These will generally be a nitrogen containing ashless dispersant having a relatively high molecular weight aliphatic hydrocarbon oil solubilizing group attached thereto or an ester of a succinic acid/anhydride with a high molecular weight aliphatic hydrocarbon attached thereto and derived from monohydric and polyhydric alcohols, phenols and naphthols.

The nitrogen containing dispersant additives are those known in the art as sludge dispersants for crankcase motor oils. These dispersants include mineral oil-soluble salts, amides, imides, oxazolines and esters of mono- and dicarboxylic acids (and where they exist the corresponding acid anhydrides) of various amines and nitrogen containing materials having amino nitrogen or heterocyclic nitrogen and at least one amido or hydroxy group capable of salt, amide, imide, oxazoline or ester formation. Other nitrogen containing dispersants which may be used in this invention include those wherein a nitrogen containing polyamine is attached directly to the long chain aliphatic hydrocarbon as shown in U.S. Pat. Nos. 3,275,554 and 3,565,804 where the halogen group on the halogenated hydrocarbon is displaced with various alkylene polyamines.

Another class of nitrogen containing dispersants which may be used are those containing Mannich base or Mannich condensation products as they are known in the art. Such Mannich condensation products generally are prepared by condensing about 1 mole of an alkyl substituted phenol with about 1 to 2.5 moles of formaldehyde and about 0.5 to 2 moles polyalkylene polyamine as disclosed, e.g. in U.S. Pat. No. 3,442,808. Such Mannich condensation products may include a long chain, high molecular weight hydrocarbon on the phenol group or may be reacted with a compound containing such a hydrocarbon, e.g. alkenyl succinic anhydride as shown in said aforementioned U.S. Pat. No. 3,442,808.

Monocarboxylic acid dispersants have been described in U.K. Pat. Specification No. 983,040. Here, the high molecular weight monocarboxylic acid can be derived from a polyolefin, such as polyisobutylene, by oxidation with nitric acid or oxygen; or by addition of halogen to the polyolefin followed by hydrolyzing and oxidation. Another method is taught in Belgian Pat. No. 658,236 where polyolefins, such as polymers of $C_2$ to $C_5$ monoolefin, e.g. polypropylene or polyisobutylene, are halogenated, e.g. chlorinated, and then condensed with an alpha-beta-unsaturated, monocarboxylic acid of from 3 to 8, preferably 3 to 4, carbon atoms, e.g. acrylic acid, alpha-methyl-acrylic acid, etc. Esters of such acids, e.g. ethyl methacrylate, may be employed if desired in place of the free acid.

The most commonly used dicarboxylic acid is alkenyl succinic anhydride wherein the alkenyl group contains about 50 to 400 carbon atoms.

Primarily because of its ready availability and low cost, the hydrocarbon portion of the mono- or dicarboxylic acid or other substituted group is preferably derived from a polymer of a $C_2$ $C_5$ monoolefin, said polymer generally having a molecular weight of about 700 to about 5000. Particularly preferred is polyisobutylene.

Amines, including those previously described under the heading The Amine Component may also be used to make the ashless dispersant. However, polyalkyleneamines are usually the amines used to make the dispersant. These polyalkyleneamines include those represented by the general formula:

$$H_2N(CH_2)_n-[NH(CH_2)_n]_m-NH(CH_2)_nNH_2$$

wherein n is 2 or 3, and m is 0 to 10. Examples of such polyalkyleneamines include diethylene triamine, tetraethylene pentamine, octaethylene nonamine, tetrapropylene pentamine, as well as various cyclic polyalkyleneamines.

Dispersants formed by reacting alkenyl succinic anhydride, e.g. polyisobutenyl succinic anhydride and an amine are described in U.S. Pat. Nos. 3,202,678, 3,154,560, 3,172,892, 3,024,195, 3,024,237, 3,219,666, 3,216,936 and Belgium Pat. No. 662,875.

Alternatively, the ashless dispersants may be esters derived from any of the aforesaid long chain hydrocarbon substituted carboxylic acids and from those hydroxy materials previously described under the heading The Alcohol Component. However, polyhydric alcohols are the most preferred alcohol compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms, pentaerythritol, dipentaerythritol, etc.

Dispersants, particularly the alkenyl succinic polyamine type dispersants, can be further modified with a boron compound such as boron oxide, boron halides, boron acids and ester of boron acids in an amount to provide about 0.1 to about 10 atomic proportions of boron per mole of the acylated nitrogen compound as generally taught in U.S. Pat. Nos. 3,087,936 and 3,254,025. Mixtures of dispersants can also be used such as those described in U.S. Pat. No. 4,113,639.

The oils may contain from 1.0 to 10 wt. %, preferably 2.0 to about 7.0 wt. % of these dispersants.

Metal Detergents

The most common metal detergents are the alkaline earth metal and alkali metal detergents. These may be present for example as the metal salts of sulphonic acids, alkyl phenols, sulphurized alkyl phenols, alkyl salicylates, naphthenates, and other oil soluble mono- and di-carboxylic acids.

Frequently the metal detergents are overbased, e.g. with carbon dioxide. Thus, highly basic alkaline earth metal sulfonates are usually produced by heating a mixture comprising an oil-soluble alkaryl sulfonic acid with an excess of alkaline earth metal compound or sodium above that required for complete neutralization of the sulfonate and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylaton of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 5 to more than 30 carbon atoms such as for example haloparaffins, olefins that may be obtained by dehydrogenation of paraffins, polyolefins as for example polymers from ethylene, propylene, etc. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount of ranges from about 100 to 220%, although it is preferred to use at least 125%, of the stoichiometric amount of metal required for complete neutralization.

Other methods for preparation of the highly basic alkaline earth metal alkaryl sulfonates are known such as in U.S. Pat. Nos. 3,150,088 and 3,150,089 wherein overbasing is accomplished by hydrolysis of an alkoxidecarbonate complex with the alkaryl sulfonate in a hydrocarbon solvent-diluent oil.

A preferred alkaline earth sulfonate is magnesium alkyl aromatic sulfonate having a total base number ranging from about 300 to about 500 with the magnesium sulfonate content ranging from about 25 to about 32 wt. % based upon the total weight of the additive system dispersed in Solvent 150 Neutral Oil.

The sulfonized metal phenates can be considered the "metal salt of a phenol sulfide" which thus refers to a metal salt, whether neutral or basic, of a compound typified by the general formula:

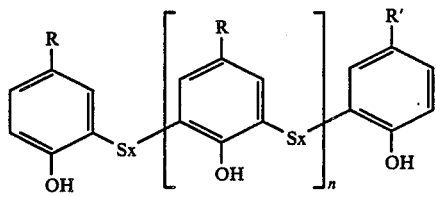

where x=1 or 2, n=0, 1 or 2 or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful contain from about 2 to about 14% by weight, preferably about 4 to about 12 wt. % sulfur based on the weight of sulfurized alkyl phenol.

The sulfurized alkyl phenol is converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal phenol is greater than that of stoichiometry, e.g. basic sulfurized metal dodecyl phenate has a metal content up to and greater than 100% in excess of the metal present in the corresponding normal sulfurized metal phenates wherein the excess metal is produced in oil-soluble or dispersable form (as by reaction with $CO_2$).

Other metal detergents include salicylates and naphthenates, such as taught in U.S. Pat. Nos. 2,744,069; 2,807,643; 2,865,956 and 3,704,315.

The following examples, wherein all parts are parts by weight, which include preferred embodiments, further illustrate the present invention.

EXAMPLE 1

This example shows grafting and amination of ethylene-propylene copolymers (EP), at high temperatures and low shear conditions.

PART A 100 parts of solid ethylene-propylene copolymer rubber was added to a rubber masticator with the two rotating blades, operating at a slow speed, of 18 and 36 rpm, respectively. The copolymer was initially masticated under nitrogen for 90 minutes in a Dow-Therm heated masticator at a Dow-Therm temperature of about 350° F. Three parts of t. dodecyl mercaptan was added through a dropping funnel over a 10–20 minute period, followed by the addition of 2.0 parts of melted maleic anhydride, added through said dropping funnel. Initially, 10% of the maleic anhydride was added. Then the remaining maleic anhydride was added over a 15 minute period simultaneously while adding about 0.9 parts of 1.13 parts of initiator solution that had been made up consisting of 11.5 wt.% of ditertiary butyl peroxide dissolved in a mixture consisting of 70% of PIB 900 (polyisobutylene of 900 number average molecular weight) and 30% of ISOPAR M which is a hydrocarbon solvent. After this 15 minute period, then the remaining initiator solution was added over about a 9 minute period. This last addition was followed by soaking and mixing for about 5 minutes, followed by nitrogen stripping for 20 minutes. Then 425 parts of S100NLP (Solvent Neutral mineral lubricating oil of 100 SUS viscosity at 37.8° C., low pour) oil, which have been previously sparged with nitrogen to remove moisture and volatiles, were added to the masticator in a series of small increments with each increment being mixed into the reaction mass before the next increment. Then the masticator was drained to give the oil solution of the ethylene copolymer rubber grafted with maleic anhydride.

The ethylene-propylene copolymer used above was a V.I. improver for lubricating oil and consisted of about 48 wt. % ethylene and about 52 weight % propylene. It had a Thickening Efficiency (T.E.) of about 2.0 which represents a weight average molecular weight approximately 100,000. It was an amorphous copolymer with a $\overline{M}_w/\overline{M}_n$ of about 2:1.0, and K.O. shear stability index of 30%.

Thickening Efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.8° C., to the weight percent of a test copolymer required to thicken the same oil to the same viscosity at the same temperature. T.E. is related to ($\overline{M}_n$) and is a convenient, useful measurement for formulation of lubricating oils of various grades. Polymers with T.E.'s of 1 to 2.8 or higher are frequently used as viscosity modifiers, e.g. V.I. improvers. The process of the invention is particularly useful with reducing polymers with T.E.'s of 2 to 2.8 to lower T.E. values, e.g. 2.8 to 2.2; 2.8 to 1.8; 2.0 to 1.4; etc. Generally, the T.E. will be reduced at least 0.2 T.E. units or more. PART B A reactor was charged with 73 parts of S130NLP mineral lubricating oil which was heated to 100° C. and nitrogen stripped. Following this, 100 parts of the oil solution of the ethylene copolymer grafted with maleic anhydride prepared in Part A were added to the reactor followed by mixing, nitrogen stripping and heating until the temperature reached 190° C. Then, 0.35 parts of N-aminopropyl morpholine (NAPM) was added over a 20-minute period to the reactor through an inlet line. Mixing and heating continued for one hour under nitrogen after which 16 parts of said oil were added, followed by vacuum strippig for one hour and then draining to give the final product, which was useful as a multi-functional V.I. -dispersant additive concentrate.

EXAMPLE 2

This example shows a grafting/breakdown procedure under higher temperature and low shear conditions.

The general procedure of Example 1 was repeated with the following changes.

The ethylene-propylene copolymer was masticated under nitrogen at 18/36 rpm of the two rotating blades until temperature (measured by a probe) reaches about 347° F. (Dow-Therm temperature was about 400° F.). Then 0.5 parts of mercaptan were added. After the initial 10% of maleic anhydride was added, the remaining 2.94 parts of maleic anhydride was added over about 17 minutes simultaneously with the initiator solution which was added over a total of 24 minutes. The initiator solution consisted of about 0.279 parts of di-tertiary butyl peroxide, about 0.98 parts of polyisobutylene of 900 mol. wt. and 0.42 parts of Isopar M, which initiator solution had been sparged with nitrogen before its addition. After the initiator solution was added, nitrogen stripping was carried out for 20 minutes, after which 350 parts of the nitrogen sparged S130NLP was added in increments while mixing. This resulted in an oil solution containing 22.2 wt. % of the maleic anhydride grafted ethylene-propylene copolymer with an acidity of 0.234 meq. acid per gram of the oil solution determined by titration of the succinic anhydride groups (S.A. Titration) resulting from the maleic anhydride grafting. 100 parts of this solution was reacted with 4.0 parts of NAPM with 100 parts of additional S130NLP to give a final oil concentrate containing 11.1 wt. % of the aminated grafted copolymer having a nitrogen content of 0.378 wt. % based on the oil solution. The T.E. of the aminated maleic anhydride copolymer per se was 1.71.

EXAMPLE 3

This example and next three examples demonstrates the procedure of grafting/breakdown of EP under high temperature and high shear conditions.

This example was carried out with the same charges as Example 2 except that the masticator was operated at 36/72 rpm to increase the shear while the amount of NAPM was 0.6 parts. More specifically, the ethylene-proplyene copolymer was initially masticated under nitrogen as the temperature rose to 392° F. over about 75 minutes. The maleic anhydride was added over about 15 minutes together with part of the initiator solution. Then at the same rate of addition, the balance of the initiator solution was added over another 11 minutes by which time the temperature had risen to 412°0 F. The nitrogen stripping was carried out for 20 minutes, followed by the addition of 350 parts of nitrogen sparged S130NLP in increments to facilitate dissolution. This gave an oil solution containing 22.2 wt. % of the maleic anhydride ethylene copolymer. 100 parts of this oil solution was then reacted with 0.6 parts of NAPM and diluted with more oil to give a final concentrate containing 12.3 wt. % of the aminated maleic anhydride grafted ethylene copolymer.

EXAMPLE 4

The general procedure and charges of Example 3 were repeated except that the maleic anhydride and peroxide initiator were added sequentially instead of simultaneously.

EXAMPLE 5

Example 5 was carried out in a manner similar to that of Example 3, but using 2.4 parts of maleic anhydride, 0.22 parts of di-tert butyl peroxide, then 0.54 parts of NAPM reacted with 100 parts of the graft-oil solution.

EXAMPLE 6

Example 6 was carried out in a manner similar to that of Example 3, but using 2.0 parts of maleic anhydride per 100 parts of polymer in the grafting stage and 0.54 parts of NAPM per 100 parts of oil solution (22.2% polymer) of the grafted polymer.

Comparison Example A

In order to demonstrate the difference in grafting and degradation of polymer in the absence of air or oxygen, Example A was carried out in a manner similar to Example 4 except that air was allowed into the reactor during grafting and degradation. Other conditions are shown in Table I.

K.O. Shear Stability Test

The final concentrate products of Examples 1 to 7 were blended with more basestock (Enjay 102) mineral lubricating oil to give oil solutions having a viscosity at 100° C. of 15±3 cSt. These oils were then tested in the shear breakdown test known as Kurt Ohrbahn (K.O.). This test is described in CEC method L-14 T-74.

The shear stability index is calculated as follows:

$$\text{Shear Stability Index} = \frac{\text{corrected viscosity loss} \times 100}{\text{fresh oil viscosity} - \text{oil viscosity without polymer.}}$$

The viscosities were measured at 100° C. and the approximate viscosity of the fresh oil was 15 Cs. The Shear Stability Index is reported as a %.

The characteristics and preparation of Examples 1 to 6 and Comparison Example A are summarized in the following Table.

breakdown due to shearing conditions during operation of the automotive engine.

Additive Interaction Test

The products of Examples 1 to 6 and Comparison A were tested for additive interaction. A fully formulated 10W-40 crankcase motor oil having a K.V. target value of 14.5 cSt was prepared as follows:

14.2 wt. % of the diluted product of Example 1 was added to a container, followed by 0.2 wt. % of a commercial pour point additive concentrate, and then 7.5 wt. % of an additive package containing a mixture of a polyisobutenyl succinic anhydride type ashless dispersant, a 400TBN overbased magnesium sulfonate, a zinc dithiophosphate, and antioxidants. Finally, 78.1 wt. %

TABLE I

| | Examples | | | | | | |
|---|---|---|---|---|---|---|---|
| | 1 | 2 | 3 | 4 | 5 | 6 | A |
| Grafting Charges, Parts | | | | | | | |
| Ethylene copolymer | 100 | 100 | 100 | 100 | 100 | 100 | 100 |
| Maleic Anhydride | 2.0 | 2.94 | 2.94 | 2.94 | 2.40 | 2.0 | 2.94 |
| Di.Tert.butyl peroxide | 0.13 | 0.28 | 0.28 | 0.28 | 0.22 | 0.28 | 0.28 |
| t.dodecyl mercaptan | 3.0 | 0.5 | 0.5 | 0.5 | 0.5 | 0.5 | 0.5 |
| Mineral Oil | 425 | 350 | 350 | 250 | 350 | 350 | 375 |
| Grafting Conditions | | | | | | | |
| Premastication, °F. | 340 | 347 | 392 | 389 | 383 | 390 | 340 |
| Blanket | $N_2$ | $N_2$ | $N_2$ | $N_2$ | $N_2$ | $N_2$ | Air |
| Shear rate, | Low | Low | High | High | High | High | High |
| Properties of Grafted Product | | | | | | | |
| Wt. % Active Ingredient | 19.1 | 22.2 | 22.2 | 28.6 | 22.2 | 22.2 | 21.0 |
| SA Titration, meq./g. grafted polymer | .15 | .23 | .18 | .18 | .17 | .17 | .19 |
| Amination Charges, Parts | | | | | | | |
| Grafted Product | 100 | 100 | 100 | 100 | 100 | 100 | 100 |
| Mineral Oil | 73 | 100 | 81 | 100 | 81 | 81 | 90 |
| NAPM | 0.35 | 4.0 | 0.6 | 5.0 | 0.54 | 0.54 | 0.40 |
| Properties of Aminated Product | | | | | | | |
| Wt. % Nitrogen | 0.21 | 0.37 | 0.29 | 0.32 | 0.29 | 0.23 | .26 |
| T.E. | 2.0 | 1.71 | 1.61 | 1.46 | 1.84 | 1.69 | 1.79 |
| K.O., % | 30.1 | 28.7 | 22.3 | 22.4 | 27.2 | 28.0 | 26.8 |

As seen by Table I, the low shear conditions and low amount of peroxide of Example 1 did not reduce the T.E. from 2.0 for the starting ethylene-propylene polymer, thereby indicating little or no breakdown in the copolymer molecular weight. Also, the shear stability measured by the K.O. test was 30% for the Example 1 product, as compared to 30% for the starting polymer showing no change in shear stability. Example 2 increased the amount of peroxide which resulted in a T.E. of 1.71 and a K.O. of 28.7 indicating improved shear stability. Example 2 therefore shows degradation was occuring even though the shear rate was insufficient to cause breakdown as shown by Example 1. Comparing Example 3 with a higher shear rate with Example 2 (low shear) shows the effect of increasing the shear rate as the T.E. further dropped to 1.61 in Example 3 as compared to a T.E. of 1.71 in Example 2.

Thus, Example 2 shows that heating in the presence of peroxide can cause molecular weight breakdown without shearing, while Example 3 shows shearing with the peroxide present can further increase the degradation. The remaining Examples 4 to 6 and A were at high shear with high peroxide and resulted in good polymer breakdown and an improvement in shear stability. Example 5 shows when the peroxide level was lowered that the T.E. decrease was less than at the higher peroxide levels of Examples 3, 4, 6 and A. Low shear breakdown is well known as a desirable property in V.I. improving additives. Such shear stable additives are desired so that the oil formulation does not lose its viscosity improving properties due to excessive polymer of S140NLP was added to give a finished motor oil.

The K.V. at 100° F. was measured immediately after blending and was 14.4 cSt. After storage at 60° or 80° C. for 24 hours, the K.V. at 100 was only 14.5 cSt. indicating that little viscosity increasing interaction had occurred between the product of Example 1, Part 3 and the ashless dispersant, or other additives such as the overbased sulfonate, zinc dithiophosphate, etc.

In similar fashion, the above procedure was repeated with the products of Examples 2 to comparison A in amounts to achieve equal thickening effect if no interaction occurs, i.e. the target viscosity of 14.5 cSt. Table II which follows shows the compositions.

TABLE II

Adjustment of Examples to Equal Thickening Power

| | Examples | | | | | | |
|---|---|---|---|---|---|---|---|
| Composition, wt. % | 1 | 2 | 3 | 4 | 5 | 6 | A |
| Product of Example | 14.2 | 13.7 | 14.9 | 12.6 | 13.1 | 13.9 | 13.8 |
| Added S130NLP | 0 | 0.5 | 0 | 1.6 | 1.1 | 0.3 | 0.4 |
| Pour depressant concentrate | 0.2 | 0.2 | 0.2 | 0.2 | 0.2 | 0.2 | 0.2 |
| Additive package | 7.5 | 7.5 | 7.5 | 7.5 | 7.5 | 7.5 | 7.5 |
| S140 NLP | 78.1 | 78.1 | 78.1 | 78.1 | 78.1 | 78.1 | 78.1 |
| Initial visc. | 14.4 | 15.0 | 14.8 | 15.0 | 14.6 | 14.2 | 18.0 |

An interaction was considered present if the initial K.V. of the formulation was 15 cSt. and/or the K.V. growth after 24 hours at either 60° or 80° C. is 0.5 cSt.

The interaction results are summarized in Table III which follows.

TABLE III

| Blended Sample of Example | Air Oxidized | Initial K.V. | Visc. after 24 hr. @ 60° C. | Interaction |
|---|---|---|---|---|
| 1 | No | 14.4 | 14.5 | None |
| 2 | No | 15.0 | 15.1 | None |
| 3 | No | 14.8 | 15.1 | None |
| 4 | No | 15.0 | 15.0 | None |
| 5 | No | 14.6 | 14.7 | None |
| 6 | No | 14.2 | 14.3 | None |
| A | Yes | 17.4 | 18.0 | Yes |

The results clearly indicate that the product of Comparison A made by oxidative degradation, i.e., degraded in the presence of air, showed undesirable viscosity growth or interaction between the V.I.-dispersant additive and the other additives during formulation. On the other hand, the products that were degraded catalytically in the absence of air and representing this invention did not show this interaction.

What is claimed is:

1. A process for producing a viscosity index improver additive useful in lubricating oil compositions comprising degrading an olefin polymer in the substantial absence of a solvent under inert atmosphere by heating in the presence of a free radical initiator sufficient to decrease the molecular weight of said polymer.

2. A process according to claim 1, wherein said free radical initiator is a peroxide and said degradation is carried out in the presence of an acid catalyst which activates the decomposition of said peroxide.

3. A process according to claim 2, wherein said acid catalyst is maleic anhydride.

4. A process according to claim 1 or 3, wherein said polymer and initiator are subjected to mechanical mixing and shear during said heating.

5. A process according to claim 1 or 4, wherein said polymer is heated and degraded in the presence of said free radical initiator and a chain stopping agent.

6. A process according to claim 5, wherein said polymer is degraded in molecular weight and grafted with an unsaturated material selected from the group consisting of (A) ethylenically unsaturated $C_3$ to $C_{10}$ carboxylic acid having 1 to 2 carboxylic acid groups or an anhydride group and (B) nitrogen-containing ethylenically unsaturated monomers containing 6 to 30 carbon atoms and 1 to 4 nitrogen groups.

7. A process according to claim 6, wherein degradation and grafting are carried out simultaneously.

8. A process according to claim 6, wherein said polymer is degraded in molecular weight and is then grafted.

9. A process according to claim 6, wherein said olefin polymer is a copolymer consisting essentially of ethylene and propylene having a T.E. of at least 2.0 which has been reduced in molecular weight to a T.E. of about 1.0 to 1.8 by degrading under an oxygen-free atmosphere by heating to about 120° to about 250° C. in the presence of a peroxide, grafting with maleic anhydride in the presence of said peroxide, followed by dissolving the maleic anhydride polymer in oil and reacting with an amine to form a V.I.-dispersant additive inhibited against a viscosity increasing interaction with lubricating oil ashless dispersants.

10. A process comprising degrading an oil-soluble ethylene copolymer comprising about 15 to 90 weight % ethylene and about 10 to 85 weight % of $C_3$ to $C_{28}$ alpha-olefin, said copolymer having a number average molecular weight within the range of about 5,000 to 500,000 and grafting with an unsaturated material selected from the group consisting of: (A) ethylenically unsaturated $C_3$ to $C_{10}$ carboxylic acid having 1 to 2 carboxylic acid groups or an anhydride group, and (B) nitrogen-containing ethylenically unsaturated monomers containing 6 to 30 carbon atoms and 1 to 4 nitrogen atoms, in the presence of a free radical initiator and a chain stopping agent under nitrogen.

11. A process according to claim 10, wherein said copolymer is degraded and grafted with said unsaturated material by mixing under shearing stress and under nitrogen said copolymer, unsaturated material, free radical initiator and chain stopper at about 120° to 250° C. for about 0.005 to 12 hours.

12. A process according to claims 1 or 11 wherein the degraded material is subsequently mixed with mineral lubricating oil to form an oil concentrate.

13. A process according to claim 6, wherein said polymer is degraded in the presence of about 0.1 to 10 wt. % of said unsaturated material, about 0.05 to 10 wt. % of said chain stopping material and about 0.005 to 1 wt. % of said free radical initiator, all of said weight percents being based upon the weight of said copolymer.

14. A process for forming a V.I.-dispersant additive for lubricating oil comprising heating and degrading in an inert atmosphere an oil-soluble ethylene-propylene V.I. improving solid rubber copolymer having a T.E of 2.0 and higher to a T.E. of 1.8 or less by heating to 120° C. to 250° C. and mixing the presence of a peroxide free radical generator, grafting said copolymer with maleic anhydride in the presence of said peroxide and a mercaptan chain stopping agent, and reacting said maleic anhydride grafted copolymer with tertiary N-propylamino morpholine.

15. A product produced by the process of claim 1.
16. A product produced by the process of claim 2.
17. A product produced by the process of claim 3.
18. A product produced by the process of claim 4.
19. A product produced by the process of claim 5.
20. A product produced by the process of claim 6.
21. A product produced by the process of claim 7.
22. A product produced by the process of claim 8.
23. A product produced by the process of claim 9.
24. A product produced by the process of claim 10.
25. A product produced by the process of claim 11.
26. A product produced by the process of claim 12.
27. A product produced by the process of claim 13.
28. A product produced by the process of claim 14.

29. A lubricating oil composition comprising a major amount of lubricating oil and an oil-soluble V.I. improver prepared by degrading an olefin polymer under an inert atmosphere in the presence of a free radical initiator sufficient to reduce the molecular weight of said polymer.

30. A lubricating oil composition according to claim 29, wherein said polymer and initiator are subjected to mechanical mixing and shear during said heating.

31. A lubricating oil composition according to claim 29, wherein said polymer is heated and mixed with a peroxide free radical initiator and an acid catalyst which activates the decomposition of said peroxide.

32. A lubricating oil composition according to claim 30, wherein said polymer is degraded in molecular weight and grafted with an unsaturated material selected from the group consisting of (A) ethylenically unsaturated $C_3$ to $C_{10}$ carboxylic acid having 1 to 2 carboxylic acid groups or an anhydride group and (B) nitrogen-containing ethylenically unsaturated monomers containing 6 to 30 carbon atoms and 1 to 4 nitrogen groups.

33. A lubricating oil composition according to claim 32, wherein degradation and grafting are carried out simultaneously.

34. A lubricating oil composition according to claim 27, wherein said polymer is degraded in molecular weight and is then grafted.

35. A lubricating oil composition according to claim 30, wherein said olefin polymer is a copolymer consisting essentially of ethylene and propylene having a T.E. of at least 2.0 which has been reduced in molecular weight to a T.E. of about 1.0 to 1.8 by degrading under an oxygen-free atmosphere by heating to about 120° to 250° C. in the presence of a peroxide, grafting with maleic anhydride in the presence of said peroxide, followed by dissolving the maleic anhydride polymer in oil and reacting with an amine to form a V.I.-dispersant additive inhibited against a viscosity increasing interaction with lubricating oil ashless dispersants.

36. A lubricating oil composition comprising a major amount of lubricating oil and a V.I.-dispersant additive prepared by degrading an oil-soluble ethylene copolymer comprising about 15 to 90 weight % ethylene and about 10 to 85 weight % of $C_3$ to $C_{28}$ alpha-olefin, said copolymer having a number average molecular weight within the range of about 5,000 to 500,000 and grafting with an unsaturated material selected from the group consisting of: (A) ethylenically unsaturated $C_3$ to $C_{10}$ carboxylic acid having 1 to 2 carboxylic acid groups or an anhydride group, and (B) nitrogen-containing ethylenically unsaturated monomers containing 6 to 30 carbon atoms and 1 to 4 nitrogen atoms, in the presence of a free radical initiator and a chain stopping agent under nitrogen.

37. A lubricating oil composition according to claim 36, wherein said copolymer is degraded and grafted with said unsaturated material by mixing under shearing stress and under nitrogen said copolymer, unsaturated material, free radical initiator and chain stopper at about 120° to 250° C. for about 0.005 to 12 hours.

38. A lubricating oil composition according to claim 29, wherein said degradation is carried out in the substantial absence of solvent, and the degraded material is subsequently mixed with mineral lubricating oil to form an oil concentrate.

39. A lubricating oil composition according to claim 32, wherein said polymer is degraded in the presence of about 0.1 to 10 wt. % of said unsaturated material, about 0.5 to 10 wt. % of chain stopping material and about 0.005 to 1 wt. % of said free radical initiator, all of said weight percents being based upon the weight of said copolymer.

40. A lubricating oil composition comprising a major amount of lubricating oil and a V.I.-dispersant prepared by heating and degrading in an inert atmosphre an oil-soluble ethylene-propylene V.I. improving solid rubber copolymer having a T.E. of 2.0 and higher to a T.E. of 1.8 or less by heating to 120° to 250° C. and mixing in the presence of a peroxide free radical generator, grafting said copolymer with maleic anhydride in the presence of said peroxide and a chain stopping agent, and reacting said maleic anhydride grafted copolymer with tertiary N-propylamino morpholine.

41. A lubricating oil composition having a reduced tendency to viscosity increase due to additive interaction comprising an oil-soluble ashless dispersant and a polyolefin V.I. improver prepared by heating to degradation in the presence of a free radical initiator under nitrogen.

42. A lubricating oil composition according to claim 41 which contains a metal detergent.

43. A process for producing a viscosity index improver additive useful in lubricating oil compositions comprising degrading an olefin polymer in the substantial absence of a solvent under an inert atmosphere by heating to about 120° C. to 125° C. in the presence of a free radical initiator sufficient to decrease the molecular weight of said polymer.

44. A process according to claim 1 or claim 43 wherein said free radical initiator is present in the amount of about 0.05 to 0.5 wt. %.

* * * * *